United States Patent [19]

Fardal

[11] 4,221,266
[45] Sep. 9, 1980

[54] DIGITAL MEMORY DEPTH TILLAGE SYSTEM

[75] Inventor: Randolph G. Fardal, Chicago, Ill.

[73] Assignee: International Harvester Company, Chicago, Ill.

[21] Appl. No.: 951,210

[22] Filed: Oct. 13, 1978

[51] Int. Cl.³ .................................. A01B 63/114
[52] U.S. Cl. .................................................. 172/4
[58] Field of Search ............... 37/DIG. 1, DIG. 19, 37/DIG. 20; 172/2–4, 4.5, 430; 235/92 EA; 180/170; 340/712, 756; 364/431, 426

[56] References Cited

U.S. PATENT DOCUMENTS

| | | | |
|---|---|---|---|
| 3,831,683 | 8/1974 | Ikeda | 172/4.5 |
| 3,876,867 | 4/1975 | Schull | 235/92 EA X |
| 3,952,829 | 4/1976 | Gray | 364/431 X |
| 4,053,018 | 10/1977 | Takeda | 172/4.5 |
| 4,077,475 | 3/1978 | Hind et al. | 172/3 |
| 4,112,429 | 9/1978 | Tsuha | 340/756 X |
| 4,120,364 | 10/1978 | Wooldridge | 172/4 |
| 4,132,272 | 1/1979 | Holloway et al. | 172/9 |
| 4,133,033 | 1/1979 | Noordermeer | 37/DIG. 1 |
| 4,138,723 | 2/1979 | Nehmer et al. | 364/426 X |
| 4,156,317 | 5/1979 | Schmidt | 37/DIG. 1 X |

FOREIGN PATENT DOCUMENTS

| | | | |
|---|---|---|---|
| 296951 | 3/1971 | U.S.S.R. | 172/430 |
| 442271 | 12/1974 | U.S.S.R. | 37/DIG. 1 |

Primary Examiner—Vance Y. Hum
Attorney, Agent, or Firm—Douglas W. Rudy; Ronald C. Kamp; F. David AuBuchon

[57] ABSTRACT

A system is provided for monitoring and controlling the level of a working element of an agricultural implement including a digital comparator which compares stored digital signals with digital signals corresponding to the actual position of the working element. A secondary valve is controllable from the digital comparator to limit lowering movement. The actual position digital signals are developed by counters which count clock pulses during a pulse developed by a transducer circuit and having a duration corresponding to the vertical position of the working element. Such actual position digital signals are applied to latching circuits from which a signal may be applied upon operation of a memory reset button to memory latch circuits operative to provide the stored signals and such signals may also be applied to display latching circuits.

8 Claims, 6 Drawing Figures

DIGITAL MEMORY DEPTH TILLAGE SYSTEM

BACKGROUND OF THE INVENTION

1. Field of the Invention

This invention relates to a level monitoring and control system for agricultural implements and more particularly to a system with which a depth level is continuously monitored and with which a desired depth setting may be readily registered and re-established. The system is very reliable and accurate, is economically manufacturable and can be readily applied to existing implements or incorporated in implements during manufacture thereof.

2. Description of the Prior Art

In agricultural implements such as plows, harrows and the like, the plow bottoms, disks or other working elements must be controllably movable upwardly or downwardly during operation to adjust for varying soil conditions must be movable to a fully raised position for travel or to clear an obstacle. Hydraulic systems are generally used and in a typical system, a manually operable valve controls flow of a fluid to and from a hydraulic cylinder which operates a rockshaft arranged to control the vertical position of disks or plow bottoms. The hydraulic cylinder may be double-acting or may be single-acting with the force of gravity being relied upon to effect downward movement of the working element.

With such systems, the operator must exercise a great deal of care during operation to insure that the working element is at the proper level, and when the element is raised to clear an obstacle or hazard or to make a turn at the end of a row, the operator must readjust the level after clearing the hazard or completing the turn. Such readjustments are frequent and easily result in operator fatigue and inefficient operation.

Systems have been proposed which rely on mechanical stops. These systems cannot be adjusted during operation. The operator must dismount, predict some incremental change in depth, then make a mechanical change sometimes requiring tools.

Systems have also been proposed using in place of a manually operated valve an electrically operated valve controlled from a command potentiometer which is manually operated by the operator. Such systems might be more easily controlled with greater flexibility but those proposed have been relatively expensive and have other disadvantages including high power consumption in driving the pump of the hydraulic system.

SUMMARY OF THE INVENTION

This invention was evolved with the general object of overcoming disadvantages and short-comings of prior art arrangements and of providing a system with which the depth level of operation of a working element may be easily and accurately controlled in a highly reliable manner.

Another object of the invention is to provide a system which can be readily incorporated in agricultural implements or applied to existing implements and which is economically manufacturable.

In accordance with this invention, a system is provided including a transducer circuit which develops an electrical output signal corresponding to the vertical position of a disk or other working element and a digital circuit which develops a digital signal which corresponds to the transducer circuit output signal and which forms a present position digital signal. In addition, a circuit is provided for storing a digital signal corresponding to that developed from the transducer circuit when the working element is at a desired position and the present position and stored signals are compared by a comparator circuit. When the applied signals are equal, the comparator circuit develops an output signal indicating that the working element is at the desired position and when, for example, the element is raised to clear a hazard, it may be lowered until the output signal is developed to re-establish the desired depth. With digital circuitry, a high degree of accuracy can be obtained while using components which are compact and inexpensive.

In accordance with an important feature of the invention, limit means are controlled from the comparator circuit output signal to automatically limit lowering movement and to thereby simplify operation by the operator.

To store a digital signal corresponding to a desired position of the working element, the element is moved to the desired position and present position digital signals then developed from the transducer circuit are transferred to the storage or memory circuit. Preferably, a memory reset switch is provided to effect such transfer and is located on an operating lever or other raise-lower control of the system, thereby permitting one-hand operation.

Another feature of the invention is in the provision of digital display means for continuously displaying a number corresponding to the present position digital signal so as to permit monitoring of the position of the working element at all times.

Further features of the invention relate to circuitry for developing the present position digital signals and for storing and comparing signals. A transducer circuit responds to an interrogation pulse from a clock circuit to develop an output signal having a duration corresponding to the vertical position of the element and control logic means responds to the output signal to control counting of clock pulses by a counter and to control transfer of signals from the counter to a latch circuit where they are temporarily stored.

Still another important feature relates to the form of transducer circuit for developing an output signal having a duration corresponding to the vertical position of an element. A timer circuit holds a capacitor in a discharged state and in response to an interrogation pulse allows charging of the capacitor through a variable resistor. The timer circuit compares the voltage across the capacitor with a reference voltage equal to a certain fraction of a supply voltage and returns the capacitor to a discharged state and terminates an output signal when the capacitor and reference voltage are equal.

In agricultural implements to which the invention is applied, there is a relatively large distance between the operator's position, at which at least display and control elements are positioned, and the working element which is mechanically coupled to and must be in proximity to the variable resistor of the transducer circuit. Thus relatively long connecting lines are required which are subject to voltage transients from ambient field as well as to impedance variations. The system of this invention is arranged to accommodate use of such long connecting lines while minimizing the effects of such transients and variations and obtaining accurate and reliable operation. In the system, the transducer circuitry is located in proximity to the working element with short connecting leads between the timer circuit and the resistor-capacitor circuit while the long connecting lines are provided between the transducer circuit and the other portions of the circuitry which include a power supply for both the resistor-capacitor circuit and the timer circuit.

This invention contemplates other objects, features and advantages which will become more fully apparent from the following detailed description taken in conjunction with the accompanying drawings.

DESCRIPTION OF A PREFERRED EMBODIMENT

Figure 1:
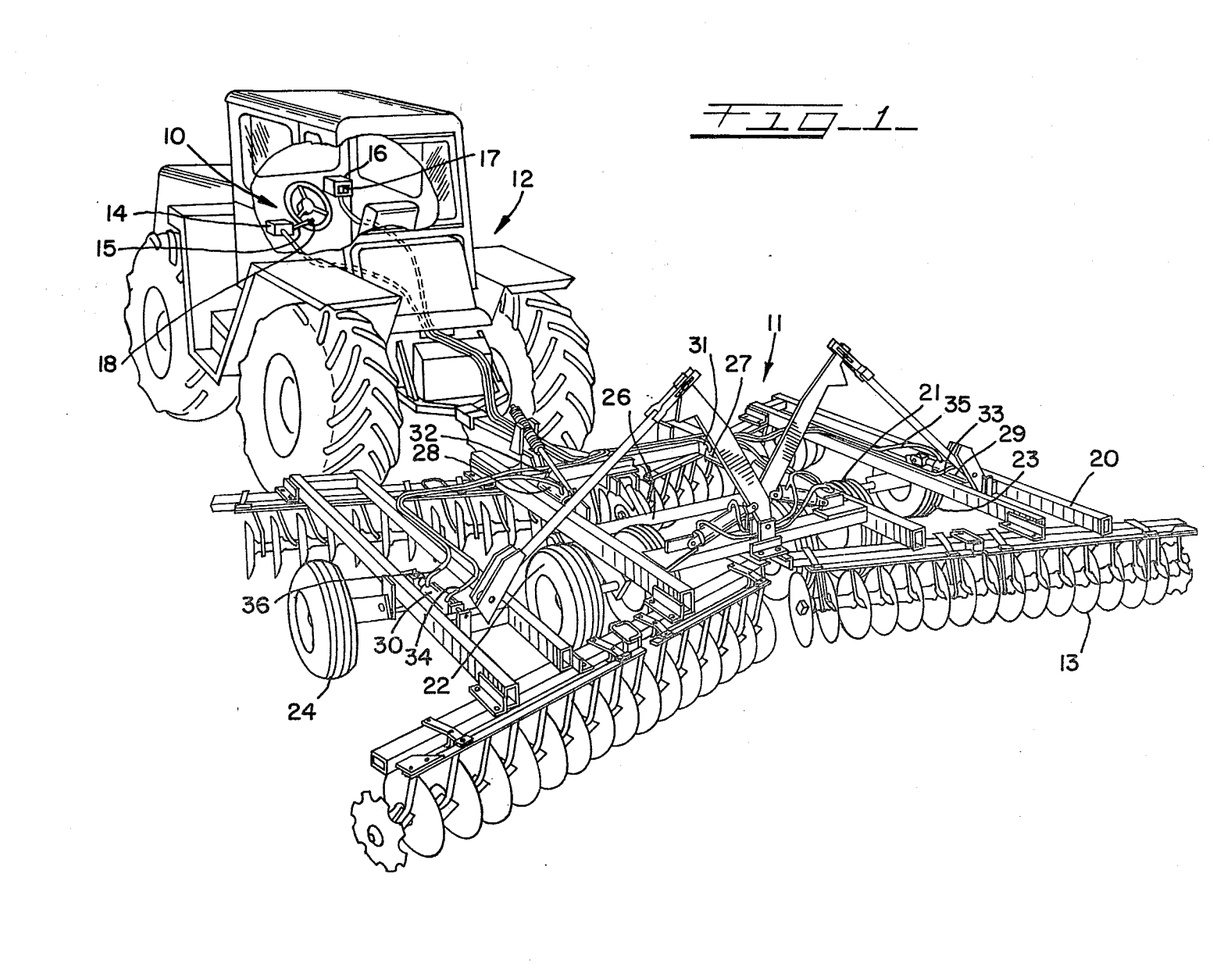
FIG. 1 is a perspective view illustrating a level monitoring and control arrangement according to the invention, shown applied to a disk harrow implement.

Reference numeral 10 generally designates a level monitoring and control system constructed in accordance with the principles of this invention and shown diagrammatically as applied to a disk harrow implement 11 which is drawn by a tractor 12 and which includes working elements in the form of disks 13. It will be understood that the invention may be applied in controlling the position of working elements of other types of agricultural implements and may be used, for example, in controlling the position of the bottoms of plows, the headers of combines, the buckets of loaders, the hoe elements of backhoes, and the blades of scrapers, etc.

A hydraulic system is used for raising and lowering the disks, controlled by a lift control valve 14 located in the operator's cab of the tractor 12 and operated by a control lever 15. In accordance with the invention, a unit 16 is mounted in the operator's cab and includes a digital readout display 17 which indicates the present actual vertical position of the disks in relation to support wheels. The control system also includes electronic circuitry which includes digital storage means operable in response to actuation of a push button switch 18 on the control lever 15 to store digital signals corresponding to the actual vertical position of the disk 13 at the time of actuation of switch 18. In addition, comparison circuit is provided for comparing the stored digital signals with digital signals corresponding to the actual position of disks 13 and for controlling valve means of hydraulic circuitry in a manner such as to prevent lowering of the disks below a position corresponding to the stored signals.

In a typical operation, the operator through operation of the control lever 15 determines the optimum level for the disks 13 according to prevailing soil conditions and through operation of the switch 18 effects storage of digital signals corresponding to the actual level at that time. Then whenever an obstruction or hazard is encountered or when turning at the end of a row, the lever 15 is operated to raise the disks. After the hazard is cleared or after the turn is completed, the lever 15 is again operated to lower the disk 13 until a set limit is reached according to the stored digital signals, the disk 13 being then positioned and thereafter maintained at the optimum level, as previously set by the operator. No readjustment is necessary.

Figure 2:
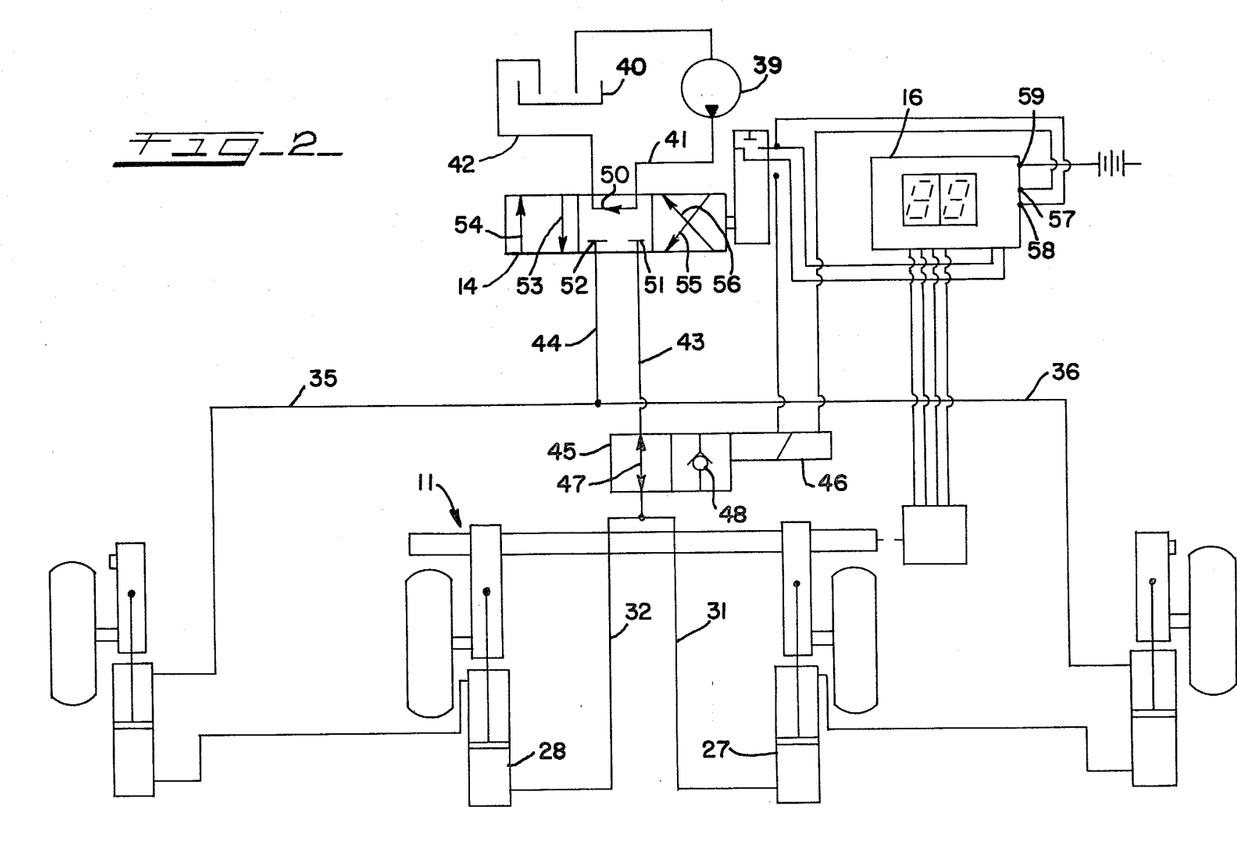
FIG. 2 is a view illustrating diagrammatically the hydraulic system of the implement and the coupling of the level monitoring and control arrangement thereto.

In the illustrated harrow implement 11, the disks 13 are carried from a frame structure 20 supported from a pair of inner support wheels 21 and 22 and a pair of outer support wheels 23 and 24. The inner wheels 21 and 22 are on arms which are secured to a journalled rockshaft 26 actuated by a pair of hydraulic cylinders 27 and 28. The outer wheels 23 and 24 are journalled in a similar manner from shafts actuated by a pair of hydraulic cylinders 29 and 30. The frame structure 20 and thereby the disk 13 are raised by supplying fluid under pressure through lines 31 and 32 to the cylinders 27 and 28 from which fluid is supplied through lines 33 and 34 to cylinders 29 and 30. Fluid flows from cylinders 29 and 30 to lines 35 and 36. To lower the disks 13, the operation is reversed with fluid flowing through lines 35 and 36 to cylinders 29 and 30, with fluid flowing from cylinders 29 and 30 through lines 33 and 34 to cylinders 27 and 28 and with fluid flowing from cylinders 27 and 28 to lines 31 and 32.

A pump 39 has an inlet connected to a reservoir 40, the outlet of pump 39 and the reservoir 40 being connected through lines 41 and 42 to the lift control valve 14. Valve 14 is connected through a line 43 to lines 31 and 32 and through a line 44 to lines 35 and 36.

In the system of this invention, a secondary valve 45 is provided which is operated by a solenoid 46 and which is preferably located on the implement 11 close to the cylinders 27 and 28. The manner of flow through valve 45 is indicated diagrammatically in FIG. 2. When solenoid 46 is deenergized, fluid may flow in either direction as indicated by double ended arrow 47. When solenoid 46 is energized, a check valve 48 is operative, permitting flow from line 43 to lines 31 and 32 for raising of the disks 13 but blocking flow in the reverse direction to prevent lowering of the disks 13.

The lift control valve 14 has three positions. In a neutral position, fluid flows in a recirculating path from line 41 to line 42, as indicated by arrow 50 with fluid flow to or from lines 43 and 44 being blocked, as indicated by lines 51 and 52. In a "raise" position, fluid flows from line 41 to line 43 and from line 44 to line 42 as indicated by arrows 53 and 54. In a "lower" position, fluid flows from line 41 to line 44 and from line 43 to line 42 as indicated by crossed arrows 55 and 56.

Figure 3:
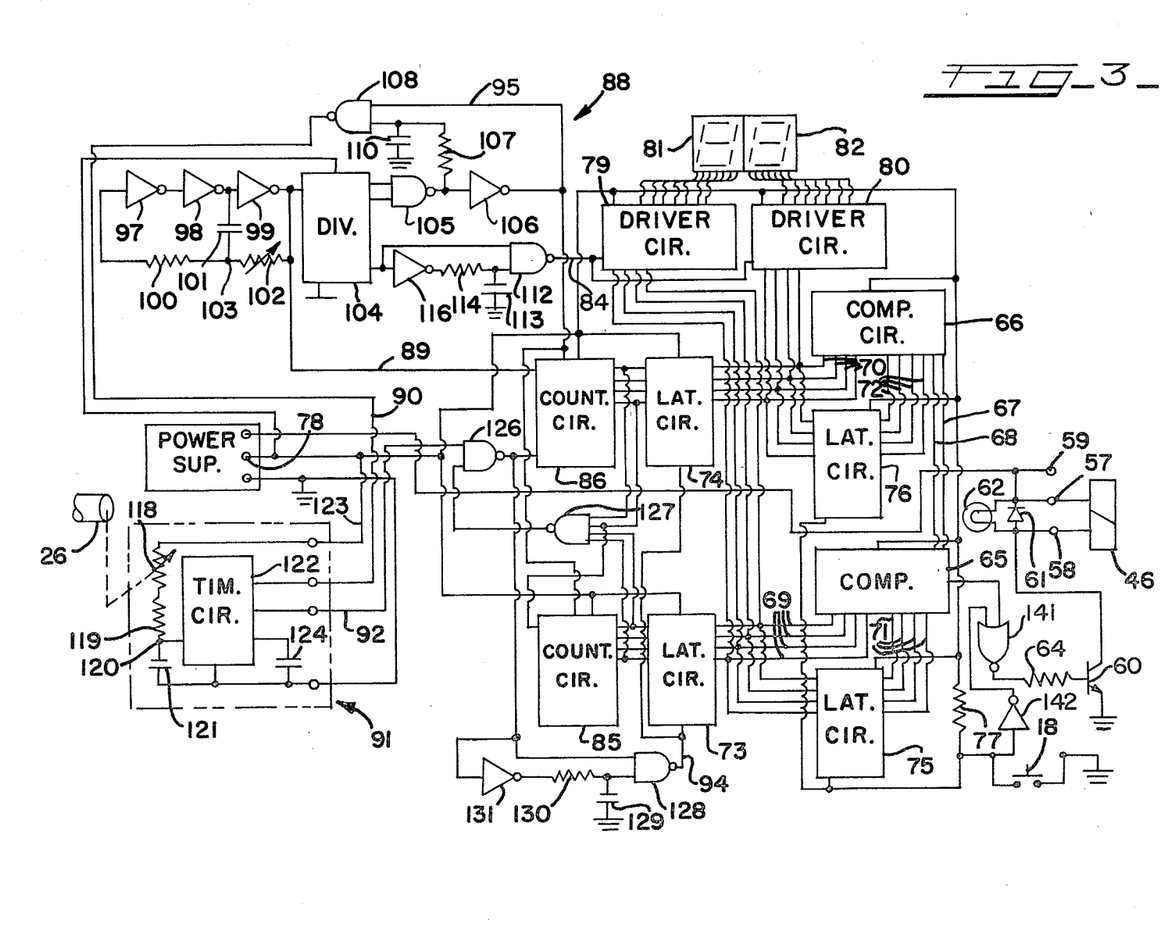
FIG. 3 is a circuit diagram of the level monitoring and control arrangement.

The operating solenoid 46 for the valve 45 is connected to terminals 57 and 58 which are connected to a positive power supply terminal 59 and to the collector of a transistor 60 the emitter of which is connected to ground. A protective diode 61 and an indicator lamp 62 are connected in parallel with the solenoid 46. The base of the transistor 60 is connected through a resistor 64 to an output terminal of a 4-bit magnitude comparator circuit 65 coupled to a second 4-bit magnitude comparator circuit 66 through lines 67 and 68.

Comparator circuits 65 and 66 compare BCD (binary coded decimal) signals developed on four-conductor "tens" and "ones" busses 69 and 70 with corresponding BCD signals developed on busses 71 and 72. Busses 69 and 70 are connected to the outputs of a pair of quad clocked "D" latch circuits 73 and 74 which, as hereinafter described, operate to develop BCD signals which substantially correspond to the current actual vertical position of the disks 13, the digital signals stored in the latch circuits 73 and 74 being continually up-graded at a rapid repetition rate. Busses 71 and 72 are connected to the outputs of another pair of quad clocked "D" latch circuits 75 and 76 which operate as a limit position memory and which have inputs coupled to the busses 69 and 70 and hence to the outputs of latch circuits 73 and 74. Clock inputs of the latch circuits 75 and 76 are connected through a resistor 77 to terminal 78 of a power supply which may be at plus 8 volts relative to ground, and such clock inputs are also connected through the push button switch 18 to ground.

When the push button switch 18 is momentarily closed to ground the clock inputs of the latch circuits 75 and 76, the signals then developed at the outputs of the actual position latch circuits 73 and 74 are entered into and thereafter stored by the memory latch circuits 75 and 76. When the signals applied on the tens and ones busses 69 and 70, reflecting the current actual position of the disks, are equal to or less in magnitude than the signals on the tens and ones busses 71 and 72, reflecting the position stored in the memory, the comparator 65 output goes low and if the push button switch 18 is open, a positive output signal is applied through the NOR gate 141 and the resistor 64 to the base of transistor 60 which then conducts heavily, energizing the valve solenoid 46 and operating the valve 45 to place the check valve 48 in an operative condition in which it blocks flow to prevent lowering of the disks 13. The second input to the NOR gate comes from the inverter 142 connected to clock inputs of the latch circuits 75 and 76.

The outputs of the actual position latch circuits 73 and 74 are connected through the busses 69 and 70 to the inputs of a pair of BCD-to-7 segment latch-decoder-driver circuits 79 and 80 which have outputs connected to a pair of display devices 81 and 82 which display the tens and ones digits of a number representing the current actual position of the disks 13. The display is updated periodically at a certain rate, about six times per second, for example, by periodic application of a display up-date signal through a line 84 to latch-enable inputs of circuits 79 and 80, the signals then present on busses 69 or 70 being stored and corresponding digits being then displayed.

To develop the signals at the outputs of the latch circuits 73 and 74 corresponding to the actual position of the disks 13, circuitry is provided which includes a counter formed by a pair of four stage BCD up counter circuits 85 and 86 which have outputs connected to inputs of the latch circuits 73 and 74. A clock circuit 88 is provided which has four functions, one of which is to supply clock pulses at a high frequency on a line 89 for counting by the counters 85 and 86.

Another function is to periodically supply an interrogation pulse through a line 90 to a transducer circuit 91 which thereafter develops a pulse on a line 92 having a duration varying as a function of the vertical position of the disks 13. During the pulse so developed, the counters 85 and 86 count the high frequency clock pulses developed on line 89 and at the termination of the pulse on line 92 or when a full count is reached, a latching pulse is applied through a line 94 to the latch circuits 73 and 74. Thereafter, as a third function of the clock circuit 88, a reset pulse is applied through a line 95 to the counter circuits 85 and 86. The fourth function of the clock circuit 88 is to supply the periodic display up-date signal on line 84.

The clock circuit 88 comprises a high frequency oscillator formed by three inverters 97, 98 and 99 connected in cascade, the input of the first inverter 97 and the outputs of the second and third inverter 98 and 99 being respectively connected through a fixed resistor 100, a capacitor 101 and an adjustable resistor 102 to a circuit point 103. The circuit oscillator operates at frequency of approximately 100 KHz, for example, and the output thereof, at the output of the third inverter 99 is applied through the line 89 to the counter 86 and is also applied to the clock input of a 14 stage ripple-carry binary counter or divider 104. Outputs of the seventh and eighth stages of the divider are connected to inputs of a NAND gate 105 having an output connected to the input of an inverter 106 and also connected through a resistor 107 to an input of a NAND gate 108 which is connected through a capacitor 110 to ground. A second input of NAND gate 108 is connected to the output of the inverter and also through a line 95 to reset inputs of counters 85 and 86. The output of the NAND gate 108 is connected to the line 90.

The NAND gate 105, having inputs connected to the outputs of the seventh and eighth counter stages, develops pulses at a rate equal to the oscillator frequency divided by 256 with each pulse having a duration equal to the time required to develop 64 oscillator or clock pulses. With an oscillator or clock frequency of 100 KHz, the pulses are developed at a rate of 390.625 Hz and each has a duration of 640 microseconds. Such pulses, inverted by the inverter 106, form reset pulses which hold the counters 85 and 86 in a reset condition.

An interrogation pulse is developed at the output of the NAND gate 108 at the leading rising edge of each reset pulse. One input of the gate 108 is in a high state for the duration of each reset pulse, the other input which prior thereto is in a high state is maintained in a high state until the capacitor 110 discharges through the resistor 107. With both inputs in a high state for a short time, the output of the gate 108 is placed in a low state to form an interrogation pulse on line 90.

To develop a display up-date signal on the line 84, it is connected to the output of a NAND gate 112 which has one input connected to the output of the fourteenth or final stage of the divider 104 and second input connected through a capacitor 113 to ground and through a resistor 114 to the output of an inverter 116 the input of which is connected to the output of the final stage of divider 104. When the output of the final stages of divider 104 is in a low state, the output of the inverter 116 is high and the capacitor 113 is charged. When the output of the final stage of divider 104 shifts to a high state, the output of inverter 116 shifts to a low state and the capacitor 113 starts discharging through the resistor 114 but remains charged above a certain level for a time interval dependent upon the time constant of the RC circuit. Both inputs of the gate 112 will be high for a certain time interval causing the output on line 84 to go low and at the end of the time interval when the output goes high the outputs of the latch-decoder-driver circuits 79 and 80 will be fixed according to the BCD code then applied from latch circuits 73 and 74 to the inputs thereof.

The transducer circuit 91 responds to each interrogation pulse applied thereto through line 90 to develop a pulse on line 92 having a duration varying as a function of the vertical position of the disks 13. The circuit 91 includes a potentiometer 118 connected as a variable resistor with the movable contact thereof being mechanically coupled to the rockshaft 26 so that the resistance is varied in accordance with angular rotation of the rockshaft 26 and thereby in accordance with vertical movement of the disks 13. The potentiometer or variable resistor 118 is connected in series with a fixed resistor 119 between power supply terminal 78 and a circuit point 120 which is connected through a capacitor 121 to ground. Circuit point 120 is connected to discharge and threshold inputs of a timer circuit 122 which is connected to operate as a monostable or one-shot multivibrator and which has an output terminal connected to line 92. A supply voltage input connected through a line 123 to terminal 78 and a control voltage terminal connected through a capacitor 124 to ground.

The circuit 122 which may preferably be a type 555 integrated circuit includes a flip-flop which in a reset condition causes the capacitor 121 to be held discharged through a transistor. The circuit 122 further includes a first voltage comparator which compares a voltage equal to one third of the supply voltage with that applied through the line 90 and when at the leading edge of an interrogation pulse, the voltage on line 90 drops to a value below one-third of the supply voltage, the flip-flop is triggered to a set condition to develop a positive output voltage. A second voltage comparator within the circuit 122 compares the voltage developed at the threshold input connected to the circuit point 120 with a control voltage which in the absence of an externally developed control voltage is developed internally by a voltage divider to be equal to two-thirds of the supply voltage. The control voltage terminal of the circuit 122 is connected only to the stabilizing capacitor 124.

When the voltage at circuit point 120 rises to a value equal to two-thirds of the supply voltage, the flip-flop is triggered by the second voltage comparator to its reset state to terminate the output pulse and to discharge the capacitor 121.

The transducer circuit 91 is located close to the rockshaft 26, for a short mechanical connected between the rockshaft 26 and the contact of resistor 118, and the circuit is constructed as a compact shielded unit with very short connecting leads between the circuit 122 and resistors 118 and 119 and capacitors 121 and 124, minimizing transient signals from ambient fields. The lines 90, 92 and 123 may be quite long, extending from the implement at a position adjacent the rockshaft 26 to a location in the front part of the operator's cab and, as a result, there may be voltage and resistance variations as well as transient signals from ambient disturbing fields. With the circuit as shown and described, however, any adverse effect of such variations and signals is minimized. Since the capacitor charging current and the internally developed control voltage are both proportional to the supply voltage, the duration of the output pulse is substantially independent of variations in the supply voltage. It also independent of the typical resistances of lines 90, 92 and 123 and is not affected by transient voltages unless they are of extremely large magnitude. Thus the transducer circuit 91 is very stable, reliable and accurate in operation.

The output signal of the transducer circuit 91 is applied through the line 92 to one input of a NAND gate 126 the output of which is connected to a "clock" input of counter 86, it being noted that the line 89 is connected to an "enable" input of the counter 86, the counter 86 being such that such clock and enable lines are interchangeable for incrementing on either positive-going or negative-going transitions. It is also noted that the output of the fourth stage of the ones counter 86 is connected to the enable input of the tens counter 85 with the clock input of the tens counter 85 being grounded.

The second input of the NAND gate 126 is connected to the output of another NAND gate 127 which has inputs connected to the first and fourth stages of counter 85 and the first and fourth stages of the counter 86. The output of gate 127 goes to a low state when a full count of 99 is reached.

The output of gate 126 is low when the transducer circuit 91 is producing a high output on line 92 and when a full count of 99 has not been reached and under such conditions the counters 85 and 86 are operative, provided that no high reset signal is being applied from the output of inverter 106 to the reset inputs of counters 85 and 86. The output of gate 126 goes high to stop the counting operation at the termination of the transducer output pulse on line 92 or when the output of gate 127 goes low in response to a full counter, whichever occurs earlier.

When the output of the gate 126 goes high, a count latch pulse is applied to the latch circuits 73 and 74 through the line 94. Line 94 is connected to the output of a NAND gate 128 having one input connected to the output of gate 126 and having a second input connected through a capacitor 129 to ground and through a resistor 130 to the output of an inverter 131 the input of which is connected to the output of gate 126. At the time of transition of the output of gate 126 to a high state the capacitor 129 is in a charged state and it thereafter discharges through the resistor 130. With both inputs of gate 128 being high, the output thereof goes low for a time interval dependent upon the RC time constant. At one transition the count of the counters 85 and 86 is stored in the latch circuits.

Figure 4:
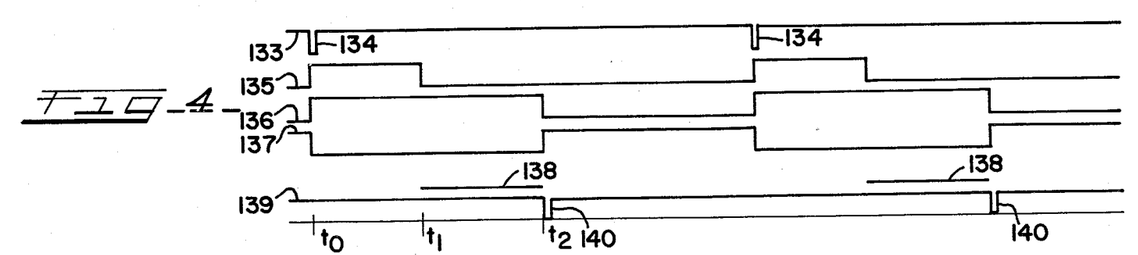
FIGS. 4, 5 and 6 are timing diagrams illustrating wave forms produced at certain points of the circuitry in certain conditions of operation.
Figure 5:
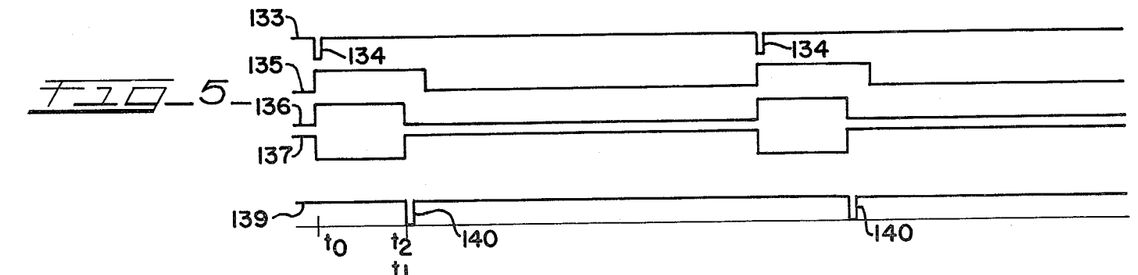
Figure 6:
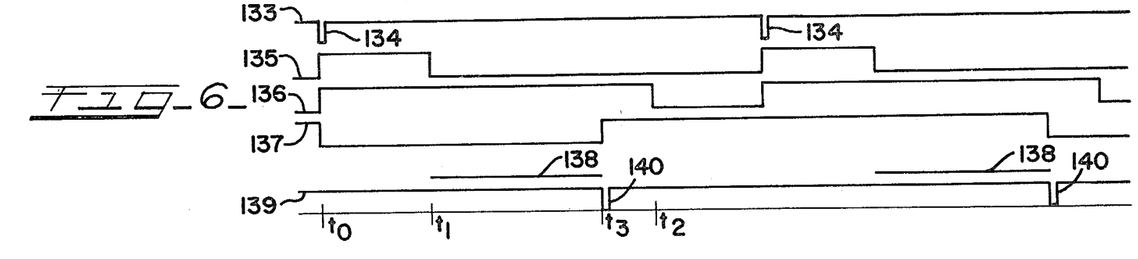

The operation may be clarified by reference to the timing diagrams of FIGS. 4, 5 and 6. In FIG. 4, reference numeral 133 indicates the waveform at the output of gate 108, applied through line 90 to the transducer circuit 91 and including interrogation pulses 134 developed periodically at a rate equal to the clock frequency divided by 256. With a clock frequency of 100 KHz, the pulses are developed at the rate of 390.625 Hz, the period or time interval from one pulse to the next being 2560 microseconds.

Reference numeral 136 indicates the wave form of the signal at the output of the inverter 106 which is applied to the reset inputs of the counters 85 and 86. The reset signal goes high at time $t_0$ coincident with the leading, negative-going edge of each interrogation pulse 134 and remains high during 64 clock pulses until a time $t_1$ for a time interval of 640 microseconds when clock frequency is 100 KHz.

Reference numeral 136 indicates the waveform of the signal at the output of the transducer circuit 91 which is applied through line 92 to gate circuit 126. The transducer output signal goes high at the time $t_0$ coincident with the leading edge of each interrogation pulse and goes low at a time $t_2$ which, in the condition depicted in FIG. 4, is after time $t_1$, the end of the reset signal and before a count of 99.

Reference numeral 137 indicates the waveform of the signal at the output of gate 126 which, in the condition depicted in FIG. 4, is the inverse of the transducer output signal 136 on line 92, going low at time $t_0$ and high at time $t_2$. The counting period is indicated by heavy line 138 and in this condition is from time $t_1$ at the end of the reset pulse signal 135 to time $t_2$ at the end of the transducer output signal 136.

Reference numeral 139 indicates the waveform of the signal at the output of gate 128 applied through line 94 to the latch circuits 73 and 74 and including latch pulses 140 developed at time $t_2$ at the end of the transducer output signal 136 in the condition depicted. In response to each latch pulse 140 the count developed in the counting period 138 is entered into the latch circuits 73 and 74.

FIG. 5 shows the waveforms developed under conditions in which the duration of the transducer output signal, waveform 136, less than the duration of the reset signal, wave form 135. In such conditions time $t_2$ is before time $t_1$ and there is no counting period. When a latch pulse 140 is developed at time $t_2$ at the end of the transducer output signal, waveform 136, there is no count and a count of zero is entered into the latch circuits 73 and 74.

FIG. 6 shows waveforms developed under conditions in which the duration of the transducer output signal, waveform 136, is greater than that required to produce a full count of 99. In this case, when the full count is reached, at a time $t_3$, the output of gate 127 goes low and the output of gate 126, waveform 137, goes high stopping the counting operation and causing generation of a latch pulse 140. Thus the counting period is from time $t_1$ to time $t_3$ and the full count of 99 is entered into the latch circuits 73 and 74.

The normal operation is that shown in FIG. 4 with a count being developed between 0 and 99, it being noted that the potentiometer or variable resistor may be adjusted mechanically to operate in mid-range and to obtain an output count of from approximately 0 to approximately 99 when the depth is varied from minimum to maximum. If, however, the transducer output pulse is shorter than that required for 0 count, FIG. 5, or longer than that required for a 99 count, FIG. 6, no seriously adverse results will be obtained.

It is noted that through the provision of the gate 127 and the stopping of the counting operation at the full count, there is insurance that the counter will not recycle and indicate relatively low count when the actual count would be in excess of the full count. Thus gross inaccuracies will not occur.

As noted above, the timer circuit 122 of the transducer circuit 91 is preferably a type 555 integrated circuit. The other circuits of the system preferably use CMOS logic also because it is possible to obtain a very high degree of stability and reliability and discrimination against noise and impedance variations in connecting lines. The following types of integrated circuits may be used:

| REFERENCE NUMERAL | TYPE NUMBER |
| --- | --- |
| 65, 66 | 4585 |
| 73, 74, 75, 76 | 4042 |
| 79, 80 | 4511 |
| 85, 86 | 4518 |
| 97, 98, 99, 106, 115, 131 | 4009 |
| 104 | 4020 |
| 105, 108, 126, 128 | 4011 |
| 112, 127 | 4012 |
| 141, 142 | 4001 |

It will be understood that the modifications and variations may be effected without departing from the spirit and scope of the novel concepts of this invention.

What is claimed is:

1. In a control for an agricultural implement including frame means, supporting wheel means journalled on said frame means, a working element supported from said frame means for raising and lowering movements relative to said supporting wheel means, a main raise-lower control manually operable by an operator, and a hydraulic system controlled from said raise-lower control for raising and lowering said working element, the improvement comprising:
   transducer means for developing an electrical signal corresponding to the vertical position of said working element relative to said supporting wheel means;
   digital position signal means responsive to said electrical signal from said transducer means for developing a present position digital signal corresponding thereto;
   clock circuit means for developing a first signal in the form of clock pulses occurring at a relatively high frequency and a second signal in the form of interrogation pulses occurring at a lower frequency, means applying said interrogation pulses to said transducer means, said transducer means being operative in response to each interrogation pulse to develop an output signal having a duration corresponding to the vertical position of said working element, said digital position signal means comprising counter means for counting of said clock pulses, and control logic means responsive to said output signal for controlling counting of said clock pulses by said counter means;
   digital signal storage means for storing a desired position digital signal corresponding to that developed by said digital position signal means when said working element is at a desired position relative to said supporting wheel means; and
   digital signal comparator means for comparing said present position digital signal from said digital position signal means and said desired position digital signal from said digital signal storage means to develop an output signal when said desired position and present position signals are equal.

2. In a control as defined in claim 1, said digital position signal means further comprising position latch circuit means coupled to said counter means for temporary storage of signals, said control logic means including means for applying a latch signal to said latch circuit means after counting of clock pulses by said counter means.

3. In a control as defined in claim 2, said digital signal storage means comprising latch circuit means, said digital signal comparator means being coupled to said position and storage latch circuit means.

4. In a control as defined in claim 3, said storage latch circuit means being coupled to said position latch circuit means, memory reset switch means for applying a latch signal to said storage latch circuit means for storage therein of signals then stored in said position latch circuit means.

5. In a control as defined in claim 1, said counter means having a certain capacity to reach a full count after counting of a certain number of pulses, said control logic means including means for discontinuing counting of said pulses by said counter means when said full count is reached.

6. In a control as defined in claim 1, said transducer means comprising capacitor means, variable resistor means for charging of said capacity means from a supply voltage with the resistance of said resistance means being controlled by the vertical position of said working element relative to said supporting wheel means, a timer circuit operative for holding said capacitor means in a discharged state and for responding to an interrogation pulse to allow charging of said capacity means through said resistance means, said timer circuit being operative for comparing the voltage across said capacitor means with a certain fraction of a supply voltage and for discharging said capacitor means when the voltage across said capacitor means reaches said certain fraction of the supply voltage.

7. In a control as defined in claim 6, a common voltage supply line for said capacitor and variable resistor means and said timer circuit.

8. In a control as defined in claim 7, said transducer means including short connecting leads between said timer circuit and said capacitor and variable resistor means and being located in proximity to said working element with there being long connecting lines between said transducer means and said digital position signal and clock circuit means, one of said connecting lines being said common voltage supply line.

* * * * *